United States Patent
Wohlfahrt

(10) Patent No.: US 10,352,439 B2
(45) Date of Patent: Jul. 16, 2019

(54) METHOD FOR OPERATING AN AUTOMATIC TRANSMISSION OF A MOTOR VEHICLE

(71) Applicant: ZF Friedrichshafen AG, Friedrichshafen (DE)

(72) Inventor: Dennis Wohlfahrt, Meersburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/750,519

(22) PCT Filed: Jul. 19, 2016

(86) PCT No.: PCT/EP2016/067106
§ 371 (c)(1),
(2) Date: Feb. 6, 2018

(87) PCT Pub. No.: WO2017/029046
PCT Pub. Date: Feb. 23, 2017

(65) Prior Publication Data
US 2018/0238444 A1     Aug. 23, 2018

(30) Foreign Application Priority Data

Aug. 14, 2015  (DE) .................. 10 2015 215 547

(51) Int. Cl.
*F16H 61/06*     (2006.01)
*F16H 3/66*      (2006.01)
*F16H 61/00*     (2006.01)

(52) U.S. Cl.
CPC .......... *F16H 61/061* (2013.01); *F16H 3/66* (2013.01); *F16H 61/0025* (2013.01);
(Continued)

(58) Field of Classification Search
CPC ................ F16H 2061/062; F16H 2061/064
See application file for complete search history.

(56) References Cited

U.S. PATENT DOCUMENTS

| 6,672,990 B2 | 1/2004 | Netzer |
| 9,002,598 B2 | 4/2015 | Schmidt et al. |

(Continued)

FOREIGN PATENT DOCUMENTS

| DE | 199 61 796 C1 | 9/2001 |
| DE | 10 2007 003 924 A1 | 7/2008 |

(Continued)

OTHER PUBLICATIONS

International Search Report Corresponding to PCT/EP2016/067106 dated Sep. 30, 2016.

(Continued)

*Primary Examiner* — Tisha D Lewis
(74) *Attorney, Agent, or Firm* — Davis & Bujold PLLC; Michael J. Bujold

(57) ABSTRACT

A method of operating an automatic transmission of a motor vehicle, in which a hydraulic pump associated with a hydraulic system for the supply of pressure is driven by a drive motor. When the motor vehicle starts, a hydrodynamic starting element forms a driving connection between the drive motor and the automatic transmission. Hydraulic shifting elements (B1, B2, B3, C1, C2) are actuated for engaging gear steps. When the drive motor is started, a shifting element (B1, B2, B3, C1, C2) of the automatic transmission is engaged, and, during the engagement process of the shifting element (B1, B2, B3, C1, C2), a time of a rotational speed variation ($n_{Ab}$, $n_{Tu}$) of the automatic transmission is determined. With the help of the determined rotational speed variation ($n_{Ab}$, $n_{Tu}$), a time point is determined at which a pressure present in the hydraulic system reaches or exceeds a target pressure level.

12 Claims, 2 Drawing Sheets

(52) U.S. Cl.
CPC .... *F16H 61/0021* (2013.01); *F16H 2061/062* (2013.01); *F16H 2200/0052* (2013.01); *F16H 2200/201* (2013.01); *F16H 2200/2043* (2013.01); *F16H 2312/14* (2013.01)

(56) References Cited

U.S. PATENT DOCUMENTS

| | | | |
|---|---|---|---|
| 9,194,486 B2 | 11/2015 | Rogner et al. | |
| 9,631,720 B2 | 4/2017 | Sohler et al. | |
| 2009/0280951 A1* | 11/2009 | Popp | F16H 61/0403 477/5 |
| 2016/0230880 A1 | 8/2016 | Beck et al. | |

FOREIGN PATENT DOCUMENTS

| | | |
|---|---|---|
| DE | 10 2007 003 923 A1 | 8/2008 |
| DE | 10 2010 020 066 A1 | 11/2011 |
| DE | 10 2013 207 005 A1 | 10/2013 |
| DE | 10 2013 220 394 A1 | 4/2015 |
| DE | 10 2013 220 530 A1 | 4/2015 |
| EP | 1 260 739 A2 | 11/2002 |

OTHER PUBLICATIONS

Written Opinion Corresponding to PCT/EP2016/067106 dated Sep. 30, 2016.
German Search Report Corresponding to 10 2015 215 545.5 dated Jun. 9, 2016.
German Search Report Corresponding to 10 2015 215 547.1 dated Jun. 16, 2016.
International Search Report Corresponding to PCT/EP2016/067105 dated Sep. 28, 2016.
Written Opinion Corresponding to PCT/EP2016/067105 dated Sep. 28, 2016.

\* cited by examiner

METHOD FOR OPERATING AN AUTOMATIC TRANSMISSION OF A MOTOR VEHICLE

This application is a National Stage completion of PCT/EP2016/067106 filed Jul. 19, 2016, which claims priority from German patent application serial no. 10 2015 215 547.1 filed Aug. 14, 2015.

FIELD OF THE INVENTION

The present invention concerns a method for operating an automatic transmission of a motor vehicle. Furthermore, the invention concerns a control unit designed to carry out the method, a corresponding computer program and a corresponding computer program product.

BACKGROUND OF THE INVENTION

Automatic powershiftable transmissions for vehicles, known as automatic transmissions for short, usually have as the starting element a hydrodynamic torque converter. Predominantly, these transmissions are designed as range-change transmissions which comprise several planetary gearsets for obtaining a number of gears or gear steps, which are usually engaged by means of hydraulic shifting elements such as disk clutches or disk brakes.

The hydrodynamic torque converter consists of an oil-filled housing, in which a pump impeller is connected as the drive input to a crankshaft of an internal combustion engine and a turbine wheel is connected as the drive output to a transmission input shaft. In addition, between the pump impeller and the turbine wheel, a guide wheel that can move in the direction of a freewheel is provided as a supporting element for the torque conversion. During operation the pump impeller, driven by the combustion engine of the vehicle, sets the converter oil into motion. The kinetic flow energy of the oil is taken up by the turbine wheel and converted to rotational movement which is transmitted to the transmission. The guide wheel deflects the oil flowing back from the turbine wheel, so that the torque of the turbine wheel delivered to the transmission is larger than the torque of the pump impeller taken up by the combustion engine. However, since the pump impeller always runs ahead of the turbine wheel, there exists a slip that depends on a speed difference and this reduces the efficiency of the converter. Accordingly the hydrodynamic converter is mostly used only as a starting element in combination with a range-change transmission or a continuously variable transmission, and also comprises a bridging clutch which bridges across the pump impeller and the turbine wheel by friction after the starting process.

For its proper function the transmission needs an effective oil supply for lubrication and cooling, as well as particular filling quantities and oil pressures for switching the hydraulic components. For this, as a rule a hydraulic pump coupled to a transmission input shaft and driven by the combustion engine is provided, which delivers the necessary oil pressure by way of a regulated, valve-controlled hydraulic system.

Furthermore, to reduce the emission of harmful substances, fuel consumption and noise levels, particularly in urban traffic, it is desirable to provide a so-termed start-stop function in which, depending on the situation and possibilities, the combustion engine should be switched off when the vehicle is at rest, for example at road junctions with traffic lights. After a subsequent engine start the transmission must be ready to transmit torque again as soon as possible. However, in vehicles with converter automatic transmissions this is not straightforward.

Since the hydraulic pump is driven by the combustion engine, the pressure oil is only available when the combustion engine is running. In contrast, when the combustion engine is switched off the hydraulic system loses pressure, whereupon the transmission control system usually disengages the current gear and shifts the transmission to neutral. Before torque can be transmitted again, a certain pressure has to build up in the hydraulic system again before the vehicle can start off. This results in a relatively long activation time until the gear is engaged after the engine is started.

On the other hand, if the transmission of torque were to begin too soon, i.e. before a sufficient pressure has built up in the piston chambers, the corresponding frictional bodies would undergo slip. Since if the oil pressure is insufficient the cooling and lubrication of wet-operating shifting elements (disk brakes) is not ensured, so that in some circumstances high clutch loads and wear result, the shifting elements concerned could be damaged within a very short time.

To prevent that, a safety interval must be maintained, within which in every case a sufficient pressure has built up before a selected gear can be engaged. However, this safety interval further prolongs the activation time and that makes it practically impossible to have start-stop operation with a high frequency of starting processes and the need, after the engine has started, for example when the traffic lights change, to start off as promptly as possible since in practice there will be frequent and long delays.

To circumvent or shorten the safety interval a special pressure-sensing system with pressure sensors in the transmission could be provided, which explicitly indicates the pressure in the pressure circuit of the hydraulic system or in the piston chambers of the disk clutches and passes that information on to the transmission control system. However, that is relatively complicated, it would incur higher manufacturing costs and would require additional components.

DE 10 2007 003 924 A1 discloses a method for controlling an automatic transmission of a vehicle. To check the torque-transmitting capacity of the automatic transmission, when the internal combustion engine is started a time variation of the rotational speed of the turbine wheel of a starting element is determined. With the help of known rotational speed characteristic of the turbine wheel, an activation time-point is then determined, at which a torque-transmitting capacity of the automatic transmission is obtained by virtue of a sufficient build-up of cooling and pressure oil. A disadvantage of this method is that to carry out the method the automatic transmission has to be operated on a test bed with the transmission output free, i.e. with the shifting elements still open.

SUMMARY OF THE INVENTION

Against that background, the purpose of the present invention is to indicate a method for operating an automatic transmission arranged in a motor vehicle, which ensures gear engagement with a high level of shifting comfort after a drive motor has been started. In addition, a corresponding control unit, a computer program and a computer program product for carrying out the method are indicated.

From a process-technological standpoint this objective is achieved with the characterizing features of the independent claims. Furthermore, a control unit, a computer program and a computer program product are objects of the other independent claims. Advantageous further developments are the object of the subordinate claims and of the description given below.

According to the present invention a method for operating an automatic transmission of a motor vehicle is proposed, in which a hydraulic pump associated with a hydraulic system for supplying pressure is driven by a drive motor, in which a hydrodynamic starting element comprising a pump impeller on the drive input side and a turbine wheel on the drive output side brings the drive motor into driving connection with the automatic transmission for the transmission of torque in the drive-train of a motor vehicle when the vehicle is started, and in which hydraulic shifting elements are actuated for the engagement of gear steps.

To achieve the stated objective the invention envisages that when the drive motor is started a shifting element of the automatic transmission is closed and during the closing process of the shifting element a time variation of a rotational speed of the automatic transmission is determined, and with the help of the rotational speed variation determined a time point is determined at which a pressure present in the hydraulic system reaches or exceeds a target pressure level.

The drive motor can for example be an internal combustion engine or an electric machine and the hydrodynamic starting element can for example be a hydrodynamic torque converter or a hydrodynamic clutch. In addition to supplying pressure oil, the hydraulic pump can serve for supplying the automatic transmission with cooling oil, in particular supplying cooling oil to the shifting elements of the automatic transmission.

The time point at which the pressure in the hydraulic system reaches or exceeds the target pressure level can be recognized with reference to a marked discontinuity in the rotational speed variation detected. For example, the rotational speed variation observed can, at that time point, show a brief indentation or a brief change of a rotational speed gradient. The time point concerned can also be recognized by a rotational speed change in which relative to a threshold value the rotational speed detected decreases briefly and then increases again.

Depending on the shifting element actuated when the drive motor is started, as the rotational speed variation, a variation of a turbine rotational speed of the hydrodynamic starting element, or a variation of a transmission input rotational speed of the automatic transmission, or a variation of a transmission output rotational speed of the automatic transmission can be determined.

Thus, with reference to the rotational speed detected it can be determined when the pressure in the hydraulic system has reached a target pressure level and the automatic transmission can transmit a drive torque of the drive motor after an engine start. If the pressure in the hydraulic system has reached the target pressure level, then a gear can be engaged very comfortably since the disk clutches of the gear to be engaged can be sufficiently well pressurized and cooled. Advantageously, a powershift process after an engine start is only enabled when it has been recognized that the pressure in the hydraulic system has reached the target pressure level.

Usually, to obtain a gear step in an automatic transmission at least two shifting elements such as disk clutches or disk brakes are closed. Accordingly, in an advantageous embodiment it is provided that the shifting element actuated when the engine is started is a shifting element that is needed for obtaining a starting gear step of the automatic transmission.

Thus, to obtain a starting gear step one shifting element is already closed, whereby the starting gear step can be engaged more rapidly.

By virtue of the method described above the time point at which the pressure in the hydraulic system has reached a target pressure level can be recognized with certainty regardless of existing transmission tolerances such as pump delivery performance or leakage, and regardless of engine switch-off times and an associated pressure loss in the hydraulic circuit when the drive motor is started. Furthermore, no additional components are needed for carrying out the method described above.

The invention also relates to a control unit for carrying out the method according to the invention. The control unit comprises means that serve for implementing the method according to the invention. These means include both hardware means and software means. The hardware means are data interfaces for the exchange of data with assemblies involved in carrying out the method according to the invention. Thus for example, the control unit receives at least one signal from a rotational speed sensor, which detects the rotational speed of the transmission input, the transmission output or the turbine shaft of the hydrodynamic starting element. Moreover, the hardware means of the control unit include a processor for data processing and a memory as necessary for data storage. The software means are program blocks for implementing the method according to the invention. The control unit can for example be in the form of a transmission control unit.

The invention also concerns a computer program with program code means suitable for carrying out a method according to the invention when the computer program is run on a computer or a corresponding computing unit, in particular a control unit according to the invention.

The computer program product according to the invention contains program code means stored on a computer-readable data carrier, which are suitable for carrying out a method according to the invention when the computer program is run on a computer or a corresponding computing unit, in particular a control unit according to the invention.

The invention is not limited to the indicated combination of features specified in the associated claims or the claims that depend on them. There are also possibilities for combining individual features with one another insofar as they emerge from the claims, the description of preferred embodiments of the invention given below, or directly from the drawings. References in the claims to the drawing by the use of indexes are not intended to restrict the protective scope of the claims.

BRIEF DESCRIPTION OF THE DRAWINGS

To clarify the invention, the description of drawings with example embodiments is attached. The drawings show.

DETAILED DESCRIPTION OF THE PREFERRED EMBODIMENTS

Figure 1:
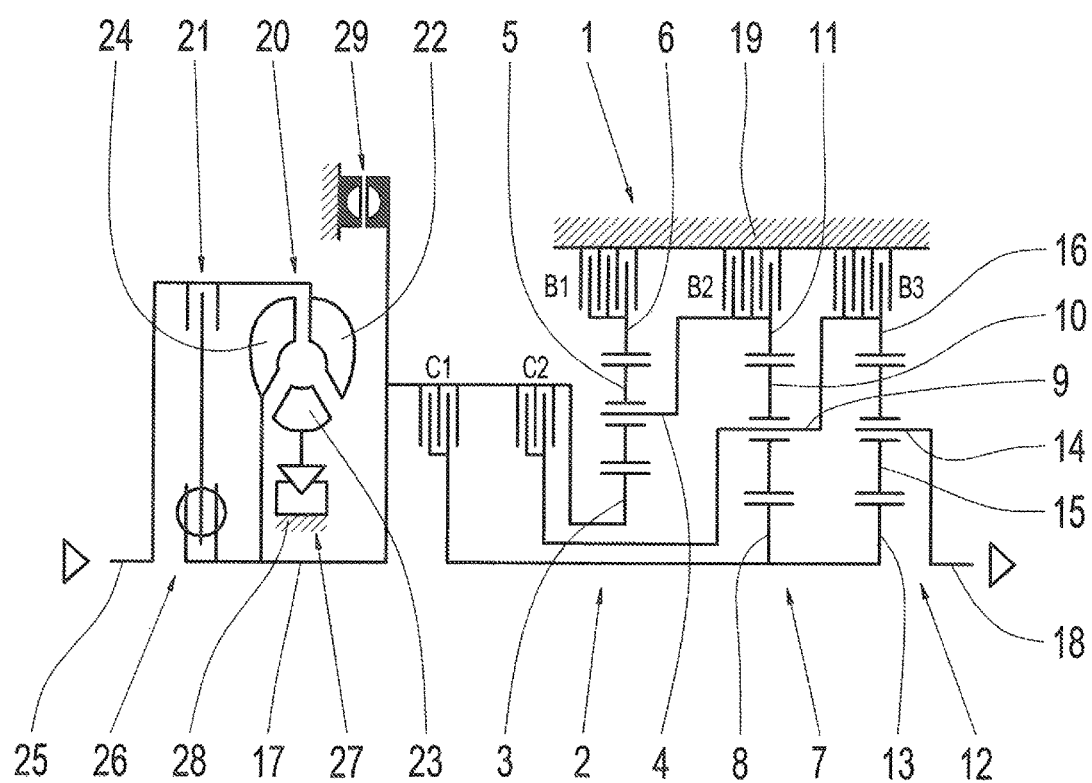
FIG. 1: A conventional drive-train with a planetary automatic transmission and a hydrodynamic torque converter, represented schematically.

According to FIG. 1 a conventional drive-train comprises a planetary automatic transmission 1 with an input shaft 17, an output shaft 18 and a hydrodynamic torque converter 20 connected upstream from these. The automatic transmission 1 comprises three planetary gearsets 2, 7, 12 coupled with one another, each consisting of a sun gear 3, 8, 13, a planetary carrier 4, 9, 14 and a ring gear 6, 11, 16 respectively. On the planetary carriers 4, 9, 14 in each case a number of planetary gearwheels 5, 10, 15 are distributed around the circumference and are mounted to rotate, these meshing on one side with the associated sun gear 3, 8, 13 and on the other side with the associated ring gear 6, 11, 16 respectively.

The input shaft 17 of the automatic transmission 1 is rigidly connected to the sun gear 3 of the first planetary gearset 2. The planetary carrier 4 of the first planetary gearset 2 is rigidly connected to ring gear 11 of the second planetary gearset 7, and the planetary carrier 9 of the second planetary gearset 7 is rigidly connected to the ring gear 16 of the third planetary gearset 12. The planetary carrier 14 of the third planetary gearset 12 is rigidly connected to the output shaft 18 of the automatic transmission 1, which in turn is in driving connection with an axle drive of a driven vehicle axle, such as an axle differential or a distributor gearset.

The automatic transmission 1 has five frictionally operating shifting elements, namely two disk clutches C1, C2 and three disk brakes B1, B2, B3, which serve for the shifting of six forward gears and one reversing gear. By closing the first disk clutch C1, the input shaft 17 is connected to the sun gear 8 of the second planetary gearset 7 and to the sun gear 13 of the third planetary gearset 12, By means of the second disk clutch 02, the input shaft 17 can be connected to the planetary carrier 9 of the second planetary gearset 7 and to the ring gear 16 of the third planetary gearset 12.

By closing the first disk brake 31, the ring gear 6 of the first planetary gearset 2 is braked fixed relative to the transmission housing 19. By means of the second disk brake 32, the planetary carrier 4 of the first planetary gearset 2 and the ring gear 11 of the second planetary gearset 7 can be fixed relative to the transmission housing 19. By closing the third disk brake B3, the planetary carrier 9 of the second planetary gearset 7 and the ring gear 16 of the third planetary gearset 12 are held fixed relative to the transmission housing 19.

From the structure of the automatic transmission 1 and the arrangement of the shifting elements C1, C2, B1, B2, B3 it emerges that the engagement of gear steps requires in each case only two shifting elements to be closed, and that to change between two adjacent gear steps, for example for a shift from the first to the second gear step, in each case only one shifting element has to be opened and one other shifting element closed.

On the input side, a hydrodynamic torque converter 20 provided with a bridging clutch 21 is connected upstream from the automatic transmission 1. The torque converter 20 comprises a pump impeller 22, a guide wheel 23 and a turbine wheel 24, which are surrounded by a housing (not shown completely). The pump impeller 22 is rigidly connected to an input shaft 25 which is connected to the driveshaft of a drive motor (not shown), and which can if necessary be connected by way of the bridging clutch 21 and a vibration damper 26 to the input shaft 17 of the automatic transmission 1. The guide wheel 23 is connected by way of an overrunning clutch 27 to a housing component 28, whereby rotation of the guide wheel 23 in the direction opposite to that of the drive motor is prevented. The turbine wheel 24 is connected to the input shaft 17 of the automatic transmission 1.

When there is a large rotational speed difference between the pump impeller 22 and the turbine wheel 24, which happens in particular when the vehicle is at rest, i.e. the turbine wheel 24 is braked and fixed, then if the bridging clutch 21 is open the torque applied at the turbine wheel 24 or the input shaft 17 of the automatic transmission 1 is larger compared with the torque on the pump impeller 22 applied by the drive motor and acts as a so-termed crawling torque. To relieve the load on the wheel brakes of the vehicle concerned, a permanent brake in the form of a primary retarder 29 arranged on the input shaft 17 of the automatic transmission 1 is also provided. Furthermore, the automatic transmission 1 comprises a hydraulic pump (not shown here) which is coupled to the input shaft 17 of the automatic transmission 1 and is driven by the drive motor.

When the drive motor is started, by virtue of a drag torque present in the hydrodynamic torque converter 20 the turbine wheel 24 is accelerated. In turn, by virtue of the drag torques of the disk clutches C1, C2 the turbine wheel 24 of the torque converter 20 accelerates the respective planetary gearsets 2, 7 and 12. In this case the rotational speeds are as yet undefined and result from the combination of drag torque and frictional torque conditions.

According to the present invention, now already at the beginning of the engine starting process a shifting element C1, C2, B1, B2, B3 is actuated. The actuation of the shifting element C1, C2, B1, B2, B3 can take place for example by actuating a proportional magnetic valve, whereby a connection of the shifting element C1, C2, B1, B2, B3 to a pressure circuit of a hydraulic system is formed and a corresponding actuating pressure for the shifting element C1 C2, B1, B2, B3 is produced.

Thereby, a piston of the shifting element C1, C2, B1, B2, B3 is for example pushed against a restoring spring more and more in the direction toward the disk packet. When the air gap of the disk packet has been completely bridged, then at that instant the shifting element C1, C2, B1, B2, B3 suddenly becomes frictionally effective. During this, in the automatic transmission 1 rotating masses are coupled and, depending on the choice of the shift elements C1, C2, B1, B2, B3 to be closed when the engine starts, a corresponding reaction torque can be detected for example at the transmission output or at the transmission input or at the turbine shaft of the torque converter 20. From that time point $t_1$ onward defined rotational speed and torque conditions exist in the automatic transmission 1 and it can be concluded that the pressure in the hydraulic system has reached or exceeded the target pressure level. A delivery quantity by the hydraulic pump (not shown here) is now substantially higher than the quantity flowing out due to the venting of oil spaces and due to leakage.

The sudden torque increase that takes place during the closing of the shifting element C1, C2, B1, B2, B3 when the mass moments of inertia are coupled can now be observed in a rotational speed signal, which can be registered by means of a rotational speed sensor.

Figure 2:
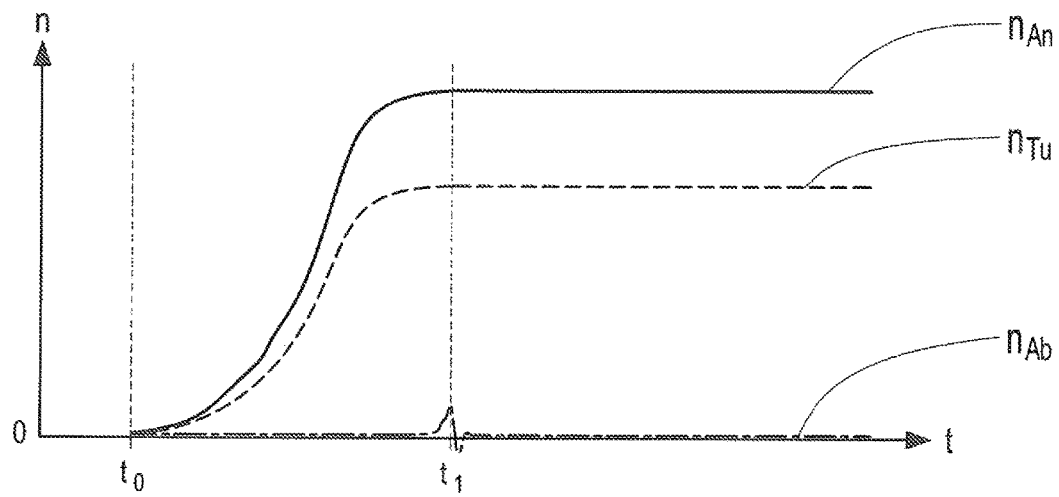
FIG. 2: A first diagram showing rotational speed variations for the recognition of a target pressure level in the hydraulic circuit of the automatic transmission.

FIG. 2 shows a first diagram with a time variation of a drive output rotational speed $n_{Ab}$, a turbine rotational speed $n_{Tu}$ and an engine rotational speed $n_{An}$, with the rotational speed n plotted on the ordinate axis and the time t plotted on the abscissa. The drive motor is started at a time $t_0$, Since the hydraulic pump is driven by the drive motor, the pressure in the hydraulic circuit begins increasing from that same time point $t_0$ onward. The torque converter 20 is also driven by the drive motor. Correspondingly, a drive input rotational speed $n_{An}$ of the pump impeller 22 of the torque converter 20 is produced, which increases until an idling rotational speed of the drive motor is reached. Due to the slip between the pump impeller 22 and the turbine wheel 24, the turbine rotational speed $n_{Tu}$ lags behind the drive input rotational speed $n_{An}$. Since the vehicle is at rest, the drive output rotational speed $n_{Ab}$ of the automatic transmission 1 is zero.

At time $t_0$ the disk brake B3 is now actuated by energizing one of the valves associated with the disk brake B3, whereby a connection is produced between the disk brake B3 and a pressure circuit of a hydraulic system and a corresponding actuation pressure for the disk brake B3 is produced. During this a piston of the disk brake B3 is pushed toward its disk packet. When the air gap of the disk packet has been completely bridged, the disk brake B3 becomes frictionally effective. When the disk brake B3 is frictionally effective all the shafts and planetary gearsets 2, 7, 12 rotating until then are coupled to the transmission housing 19 and thereby braked to a standstill. At the transmission output, a torque peak is produced, which can be recognized in the rotational speed variation of the drive output rotational speed $n_{Ab}$ as a discontinuity. From that time $t_1$ onward defined rotational speed and torque conditions prevail in the automatic transmission 1 and it can be concluded that the pressure in the hydraulic system has reached or exceeded the target pressure level.

The size of the rotational speed jump in the drive output rotational speed $n_{Ab}$ detected depends on a characteristic rigidity of the drive-train. Thus, the rigidity of the drive-train can be taken into account appropriately when evaluating the drive output rotational speed $n_{Ab}$ detected.

After the lapse of the time interval between times $t_0$ and $t_1$ the pressure in the hydraulic system has reached the target pressure level and the automatic transmission is then ready to transmit torque. To detect the drive output rotational speed $n_{Ab}$, a rotational speed sensor arranged on the output shaft 18 of the automatic transmission 1 is preferably used.

Figure 3:
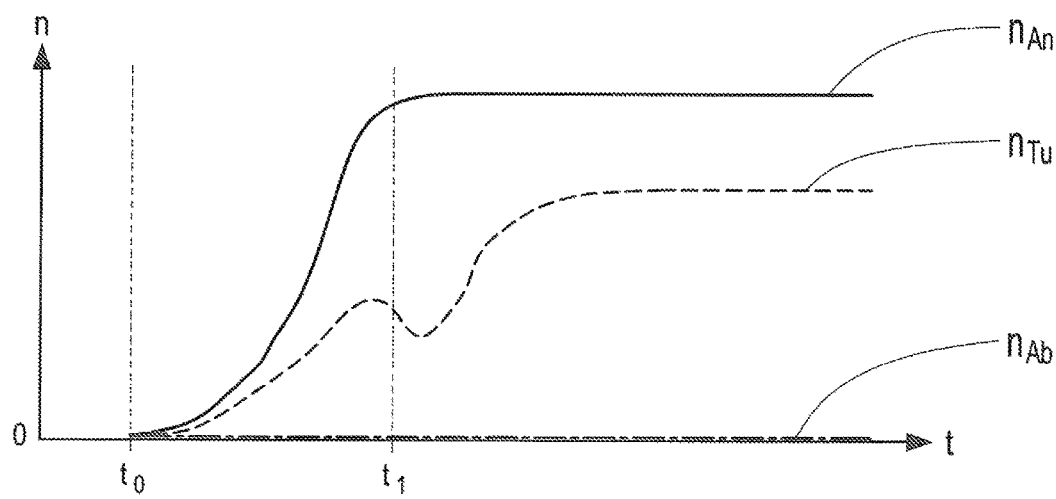
FIG. 3: A second diagram showing rotational speed variations for the recognition of a target pressure level in the hydraulic circuit of the automatic transmission.

FIG. 3 shows a second diagram with a time variation of a drive output rotational speed $n_{Ab}$, a turbine rotational speed $n_{Tu}$ and an engine rotational speed $n_{An}$, with the rotational speed n plotted on the ordinate axis and the time t on the abscissa. In this case too the drive motor is started at a time $t_0$. Since the hydraulic pump is driven by the drive motor, from that time $t_0$ onward the pressure in the hydraulic circuit begins increasing. The torque converter 20 is also driven by the drive motor. Accordingly a drive input rotational speed $n_{An}$ of the pump impeller 22 of the torque converter 20 is produced, which increases until an idling rotational speed of the drive motor is reached. Due to the slip between the pump impeller 22 and the turbine wheel 24, the turbine rotational speed $n_{Tu}$ lags behind the drive input rotational speed $n_{An}$. Since the motor vehicle is at rest, the drive output rotational speed $n_{Ab}$ of the automatic transmission 1 is zero.

In this case at time $t_0$ the disk clutch C1 is actuated by energizing one of the valves associated with the disk clutch C1, whereby the disk clutch C1 is connected to a pressure circuit of a hydraulic system and a corresponding actuation pressure for the disk clutch C1 is produced. During this a piston of the disk clutch C1 is pushed toward its disk packet. When the air gap of the disk packet has been completely bridged the disk clutch C1 becomes frictionally effective. When the disk clutch C1 is frictionally effective all the shafts and planetary gearsets 2, 7, 12 rotating until then are coupled to the turbine wheel 24 or turbine shaft and thereby synchronized with the turbine rotational speed existing at the time. At the turbine wheel 24 or turbine shaft this produces a torque peak that can be recognized in the rotational speed variation of the turbine rotational speed $n_{Tu}$. During this the turbine rotational speed $n_{Tu}$, decreases somewhat for a short time and then increases smoothly again. From that time $t_1$ onward defined rotational speed and torque conditions exist in the automatic transmission 1 and it can be concluded that the pressure in the hydraulic system has reached the target pressure level.

When the disk clutch C1 becomes frictionally effective, then in an advantageous manner a torque peak at the transmission output can be avoided. Moreover, a discontinuity in the rotational speed variation of the turbine rotational speed $n_{Tu}$ can be detected more easily than a discontinuity in the rotational speed variation of the drive output rotational speed $n_{Ab}$.

After the lapse of the interval between times $t_0$ and $t_1$, the pressure in the hydraulic system has reached the target pressure level and the automatic transmission is ready to transmit torque. To detect the turbine rotational speed $n_{Tu}$ a rotational speed sensor arranged on the turbine shaft or on the input shaft 17 of the automatic transmission 1 is used.

INDEXES

1 Planetary automatic transmission
2 First planetary gearset
3 Sun gear
4 Planetary carrier
5 Planetary gearwheel
6 Ring gear
7 Second planetary gearset
8 Sun gear
9 Planetary carrier
10 Planetary gearwheel
11 Ring gear
12 Third planetary gearset
13 Sun gear
14 Planetary carrier
15 Planetary gearwheel
16 Ring gear
17 Input shaft
18 Output shaft
20 Torque converter
21 Bridging dutch
22 Pump impeller
23 Guide wheel
24 Turbine wheel
25 Input shaft
26 Vibration damper
27 Overrunning clutch
28 Housing component
29 Primary retarder
B1 Shifting element, disk brake
B2 Shifting element, disk brake
B3 Shifting element, disk brake
C1 Shifting element, disk clutch
C2 Shifting element, disk clutch
$n_{Ab}$ Drive output rotational speed
$n_{An}$ Drive input rotational speed
$n_{Tu}$ Turbine wheel rotational speed
$t_0$ Engine start time
$t_1$ Time when the target pressure level is reached

The invention claimed is:
1. A method of operating an automatic transmission of a motor vehicle, in which a hydraulic pump associated with a hydraulic system for supplying pressure is driven by a drive motor, when the motor vehicle starts, a hydrodynamic starting element forms a driving connection between the drive motor and the automatic transmission, and hydraulic shifting elements are actuated for engaging gear steps, the method comprising:

engaging a shifting element of the automatic transmission when the drive motor is started, determining a time of rotational speed variation of the automatic transmission, during an engagement process of the shifting element, and with assistance of the determined rotational speed variation, determining a time point at which a pressure present in the hydraulic system either reaches or exceeds a target pressure level.

2. The method according to claim 1, further comprising recognizing the time point at which the pressure in the hydraulic system either reaches or exceeds the target pressure level by virtue of a discontinuity of the determined rotational speed variation.

3. The method according to claim 1, further comprising using a shifting element of a starting gear of the automatic transmission as the shifting element actuated when the drive motor is started.

4. The method according to claim 1, further comprising determining one of a variation of a turbine rotational speed of the hydrodynamic starting element, a variation of a transmission input rotational speed of the automatic transmission, and a variation of a transmission drive output rotational speed of the automatic transmission as the rotational speed variation.

5. A control unit for an automatic transmission, which is designed to carry out a method of operating an automatic transmission of a motor vehicle, in which a hydraulic pump associated with a hydraulic system for supplying pressure is driven by a drive motor, when the motor vehicle starts, a hydrodynamic starting element forms a driving connection between the drive motor and the automatic transmission, and hydraulic shifting elements are actuated for engaging gear steps, the method comprising:

engaging a shifting element of the automatic transmission when the drive motor is started, determining a time of rotational speed variation of the automatic transmission during an engagement process of the shifting element, and with assistance of the determined rotational speed variation, determining a time point at which a pressure present in the hydraulic system either reaches or exceeds a target pressure level.

6. A computer program with program code means being run on a control unit for carrying out the method according to claim 1, wherein the control unit is either a computer or a corresponding computing unit.

7. A computer program product with program code means being stored on a computer-readable data carrier for carrying out the steps according to claim 5, wherein the computer program product is run on a computer.

8. A method of operating an automatic transmission of a motor vehicle, the method comprising:

driving a hydraulic pump with a drive motor to pressurize a hydraulic system of the motor vehicle;

forming a driving connection between the drive motor and the automatic transmission by engaging a hydrodynamic starting element to start driving the motor vehicle;

selectively actuating hydraulic shifting elements of the automatic transmission to engage gear steps in the automatic transmission;

engaging a first shifting element of the hydraulic shifting elements of the automatic transmission when the drive motor is started;

determining a rotational speed variation of the automatic transmission over a period of time during engaging the first shifting element; and determining a time point at which the pressure in the hydraulic system either reaches or exceeds a target pressure level based on the determined rotational speed variation over the period of time.

9. The method according to claim 8, further comprising detecting a discontinuity of the rotational speed variation over the period of time, and the time point at which the pressure in the hydraulic system either reaches or exceeds the target pressure level is defined as a time at which the discontinuity of the rotational speed variation is detected.

10. The method according to claim 9, further comprising actuating a starting gear of the automatic transmission by engaging the first shifting element of the hydraulic shifting elements.

11. The method according to claim 10, further comprising defining the rotational speed variation as being one of:

a variation of a turbine rotational speed of the hydrodynamic starting element, a variation of a drive input rotational speed of the automatic transmission, and a variation of a drive output rotational speed of the automatic transmission.

12. The method according to claim 11, further comprising using a control unit to determine the time point at which the pressure in the hydraulic system either reaches or exceeds the target pressure level.

* * * * *